H. FERRIS.
HAND SHOCKING DEVICE.
APPLICATION FILED MAY 10, 1909.
964,009.
Patented July 12, 1910.
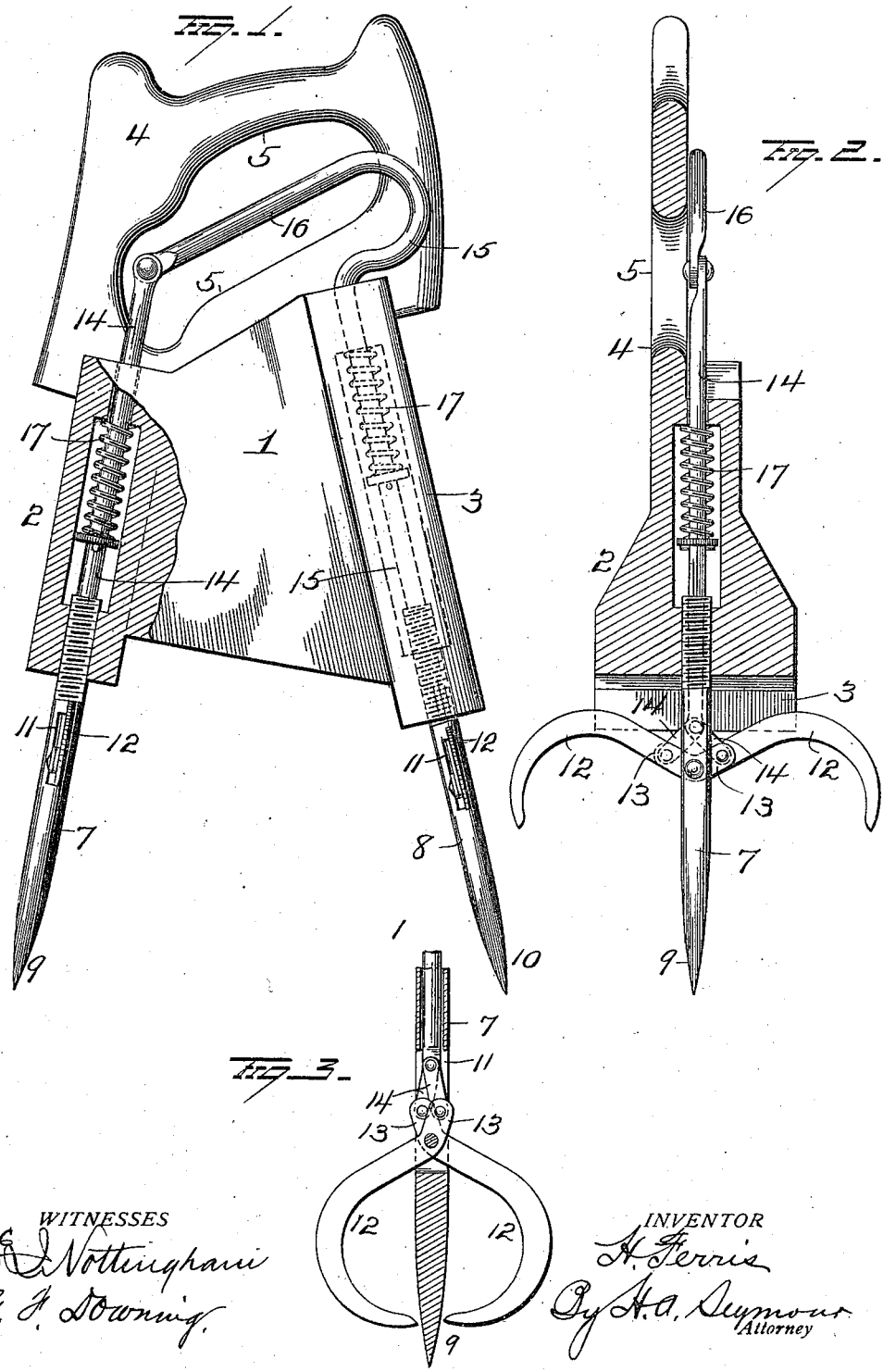
WITNESSES
INVENTOR
H. Ferris
By H. A. Seymour
Attorney

UNITED STATES PATENT OFFICE.

HENRY FERRIS, OF ARDOCH, NORTH DAKOTA.

HAND SHOCKING DEVICE.

964,009.  Specification of Letters Patent.  Patented July 12, 1910.

Application filed May 10, 1909. Serial No. 495,130.

*To all whom it may concern:*

Be it known that I, HENRY FERRIS, of Ardoch, in the county of Walsh and State of North Dakota, have invented certain new and useful Improvements in Hand Shocking Devices; and I do hereby declare the following to be a full, clear, and exact description of the invention, such as will enable others skilled in the art to which it appertains to make and use the same.

This invention relates to hand shocking devices, the object of the invention being to provide simple and efficient means to be carried and operated by hand and which will enable the operator to readily engage and grasp bundles of grain without having to bend his body to a considerable extent and which will enable him to place the bundles on a shock without bringing his hands into direct contact with the bundles of grain.

With this object in view the invention consists in certain novel features of construction and combinations of parts as hereinafter set forth and pointed out in the claims.

In the accompanying drawings, Figure 1 is an elevation partly in section of a hand shocking device embodying my improvements. Fig. 2 is a longitudinal sectional view, and Fig. 3 is a detail view.

1 represents the body portion of the device and is provided at its side edges with hollow arms or enlargements 2—3 disposed at an angle to each other so that they will diverge forwardly. The body portion 1 is provided at its upper end with a handle 4 having a slot 5 for the accommodation of the fingers of the operator's hand. Tubular tines 7—8 project from the forward or lower ends of the arms or enlargements 2—3 and at their upper ends, said tubular tines terminate within the hollow arms or enlargements. The tines 7—8 thus project forwardly or downwardly at an angle to each other and parallel with the axes of the respective arms or enlargements 2—3. The tines are provided at their forward or lower ends with pointed heads 9—10 and some distance upwardly removed from said heads, the tines are provided with elongated slots 11. Curved grappling fingers 12 (having their free ends pointed) are pivotally supported in the slotted portion of each tine and project in opposite directions from the latter. The grappling arms of each pair are provided with extensions 13 which project in opposite directions from the pivotal support of the grappling arms. The extensions 13 of each pair of grappling arms are connected, by means of links 14 with the lower end of a rod 15 which is longitudinally movable in the tubular tine. The upper end of one of the rods 15 is provided with an arm 16 extending across the opening 5 of the handle 4 and pivotally connected at its free end with the upper end of the longitudinally movable rod 14 in the other tubular tine. With this construction the operator is enabled to move both rods 14 simultaneously and thus cause the pairs of grappling arms to approach the tines and grasp a bundle of grain. The grappling arms are maintained normally in their open position by means of springs 17 located within the hollow enlargements 2—3 and engaging shoulders in said enlargements and the rods 14 respectively.

With the construction and arrangement of parts above described the operator can cause the pointed tines to enter a bundle of grain and then by operating the longitudinally movable rods 14, the curved grappling arms will be caused to approach each other and partially embrace the bundle of grain so as to prevent its escape from the tines. With a bundle of grain thus held, the operator can carry it to the shock and after placing it in position on the latter he can, by releasing the curved grappling arms, remove the device and leave the bundle in position on the shock. The operator can conveniently carry two devices, one in each hand and the work of shocking can be thus facilitated. If desired the pointed ends of the tines may be omitted and the grappling arms made to completely or partially surround a bundle of grain.

Having fully described my invention what I claim as new and desire to secure by Letters-Patent is,—

1. A hand shocking device, comprising a body portion, a plurality of tubular members rigid therewith and projecting forwardly therefrom, curved grappling arms pivotally supported by each of said tubular members, operating means located within each of said tubular members and connected with the curved grappling arms for causing the latter to engage a bundle of grain, and a single hand engaging means common to the operating means in all of said tubular members, whereby all of the grappling arms can be manually operated simultaneously.

2. A hand shocking device comprising a body portion and tubular members projecting forwardly therefrom of a pair of curved grappling arms pivotally supported by each tubular member, a longitudinally movable rod in each tubular member, links connecting said rods with the pairs of grappling arms for causing the grappling arms of each pair to approach each other when said rods are moved in one direction, springs for moving said rods in the reverse direction to normally hold the pairs of grappling arms open, and hand-engaging-means connected with both longitudinally movable rods whereby both pairs of grappling arms can be closed simultaneously on a bundle of grain.

3. A hand shocking device comprising a body portion provided with a handle, tubular tines projecting forwardly from said body portion and provided with pointed heads, said tines having slots in rear of the pointed heads, a pair of curved grappling arms pivotally supported in the slots of each tubular tine and provided with extensions projecting in reverse directions from the pivotal support of each pair of grappling arms, a longitudinally movable rod in each tubular tine, links connecting said rod with the extensions of the grappling arms, springs engaging said rod for maintaining the grappling arms normally open and hand engaging means located adjacent to the handle and connected with the longitudinally movable rods for closing the grappling arms on a bundle of grain.

In testimony whereof, I have signed this specification in the presence of two subscribing witnesses.

HENRY FERRIS.

Witnesses:
E. E. YORK,
C. W. DENNISTON.